July 5, 1960
F. COREY ET AL
2,943,863
DOLLY FOR USE WITH DISABLED VEHICLES
Filed April 3, 1958
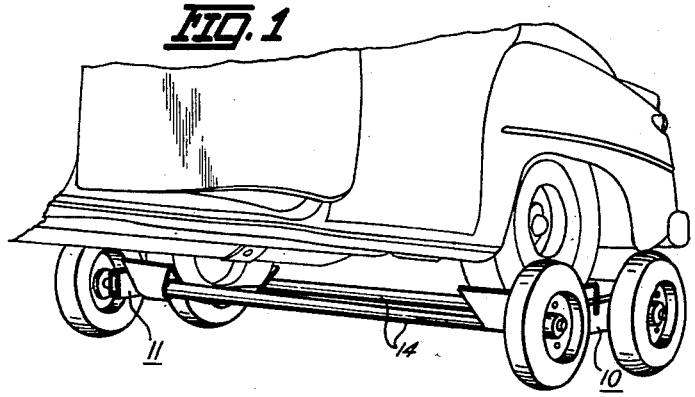
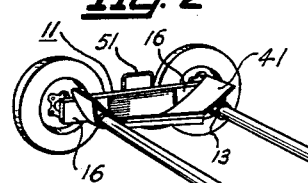
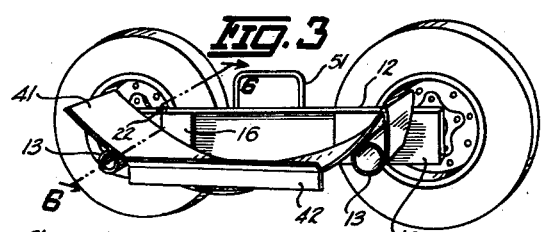
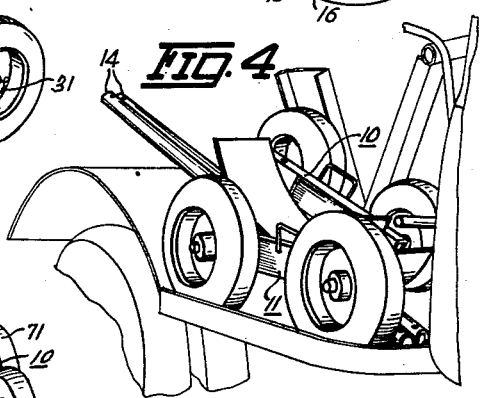
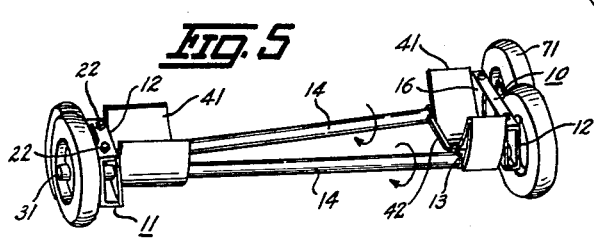
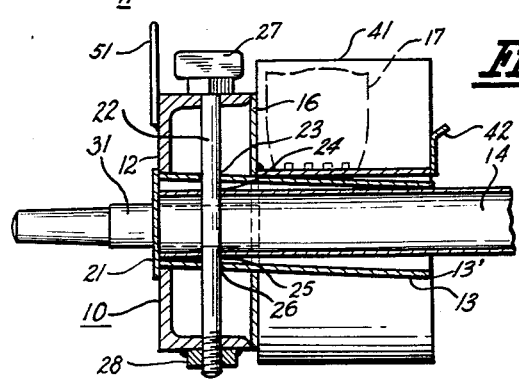
INVENTORS.
MAURICE G. SWORDS
DENNIS J. ERGER
R. DONALD PITTS
FLOURNOY COREY
BY
*Corey & Corey*
ATTORNEYS.

United States Patent Office 2,943,863
Patented July 5, 1960

2,943,863

DOLLY FOR USE WITH DISABLED VEHICLES

Flournoy Corey, Maurice G. Swords, Dennis J. Erger, and Robert D. Pitts, Cedar Rapids, Iowa, assignors to Pickwick Company, Cedar Rapids, Iowa, a corporation of Iowa Filed Apr. 3, 1958, Ser. No. 726,176

7 Claims. (Cl. 280—79.1)

This invention relates to vehicles and has particular relation to a dolly or trailer for transporting wrecked or incapacitated vehicles, such as automobiles and trucks.

The problem of transporting wrecked or incapacitated motor vehicles has become greater within the last few years with the ever increasing use of delicate hydraulic drives, and even more so with the advent and general use of air lift or air supported vehicles.

In the case of vehicles in which oil turbines, automatic transmissions and the like are used to drive the vehicle, such drives can be ruined if the vehicle is towed any distance. In moving air-cylinder-supported vehicles, the problem is more acute since, if the air pressure goes down or if the system is ruptured in any manner, the body of the vehicle squats down on the wheels and axles, making it extremely difficult for the wrecker operator to get under the vehicle to place any sort of a rolling support beneath the vehicle.

Usually only one man is sent with a wrecker to bring in a disabled vehicle. It is the usual practice for this man to pick up one or the other end of the vehicle with his wrecker and bring it in by towing it on the other two wheels. If the front end of the vehicle is wrecked, for instance, or has a flat tire, then the operator is forced to pick up this end of the vehicle and tow it on the two back wheels.

If the back wheels are driven by a hydraulic or automatic drive, it is necessary for the operator to get under the vehicle and disconnect the drive shaft, or if the vehicle is air suspended, it is necessary for him to raise the body and insert blocks beneath it. This can be a very unpleasant and almost impossible job in mud or snow or rough terrain and, in fact, some automatic transmissions cannot be disconnected without disassembling.

While dollies or supporting trailers or the like have been provided for this purpose, they are heavy awkward structures difficult for one man to place under the disabled vehicle. If, for instance, he should raise one end of the vehicle for insertion of a dolly or a trailer, the heavy dolly structure must be slid endwise between the projecting rear of the wrecker and the front of the disabled vehicle. It is almost beyond the strength of one man to do. Furthermore this trailer or dolly is awkward and hard for the operator to unload from his wrecker and reload, besides the difficulty of stowing such a dolly or trailer in or on the wrecker.

Also it is necessary, in using a conventional dolly or trailer, for the operator to chain a tongue of the dolly or the like to the drive shaft and chain the axle of the vehicle down to the dolly so that he still has to get under the wrecked or disabled vehicle to install the dollies or trailers known to the art.

Therefore an important object of our invention is to provide a dolly, for use in towing disabled vehicles, which does not need a tongue and does not need to be chained to the vehicle. All that is necessary is to place the front or rear wheels of the wrecked vehicle on the dolly and drive off.

It is also among the objects of our invention to provide a light weight dolly or trailer which is so constructed that it can be disassembled into light weight component parts, easily handled by one man, capable of being stowed in the wrecker without taking up too much space, and so constructed that it can be assembled right in position beneath the wrecker and in front of the disabled vehicle while the disabled vehicle is suspended, or readily slid into place.

Still another object of our invention is to provide a low slung dolly structure on which a vehicle may be placed without chains or blocking and which will track and operate at high speeds over rough terrain, such as gutters, shoulders, rough roads, and under all the adverse conditions that such operations encounter, and yet so formed and constructed that it is unnecessary to chain the dolly to the disabled vehicle or wrecker.

In the construction of such a light weight device, problems of sagging and misalignment might occur if we did not devise means for overcoming these difficulties, and therefore it is another object of our invention to provide means for compensating and overcoming misalignment which might occur because of sagging or distortion of structural members.

It is a still further object of our invention to provide a low-slung, steady, platform or structure supported at four widely spaced points and yet, at the same time, provide sufficient springing and torsional members and structure so that controlled springing will occur to permit alignment of the dolly over inequalities of the road surface.

A still further important object of our invention is to provide an inexpensive but strong, reliable, smooth riding supporting structure for use in the transporting of a disabled vehicle.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a view in fragmentary perspective of a dolly as it appears in position when supporting the rear end of a wrecked car.

Figure 2 is a view in perspective of a dolly in assembled relation as it appears ready for use.

Figure 3 is a view in perspective showing one of the trucks of a dolly constructed according to our invention and illustrating the application of a carrying handle and where it is located so that the truck can be transported.

Figure 4 is also a view in perspective and illustrates how the dolly may be dismounted and stowed in a wrecker.

Figure 5 is a diagrammatic view in perspective illustrating the action of the torsional forces and illustrating how the dolly is allowed to ride over inequalities of roadbed by utilizing the differential movement of the wheels of the vehicle, together with controlled torsion and misalignment so that the four wheels may move independently to a controlled degree, and Figure 6 is a transverse section taken at 6—6 illustrating the connection between a truck and the torsion bars.

Referring now to the drawings:

A dolly constructed according to a preferred embodiment of our invention preferably consists of two trucks, illustrated generally 10 and 11, each of the trucks being formed of a box-like channel 12 having inwardly projecting tubes 13 for telescopically receiving transverse torsion rods 14. There are two of the inwardly projecting tubes on each truck, and in order to secure these tubes in secure relation to meet the strains imposed on the structure, we provide plates, as illustrated at 16, which close the channel 12 to provide an inboard sidewall, and the plates and vertical walls of the channel are provided with openings to receive the tubes 13.

An important part of our invention is that the hole in the channel 12 for receiving the tube 13 is offset above that in the plate 16 to provide a 2 degree slant or bias of the tube downward at its inward inner end 13' in relation to the outer end which is adjacent a wheel, to thereby impose a controlled bend in the torque tube 14; or, in other words, the torque tube 14 is chosen with a sufficiently thin wall such that it can twist under load to permit the wheels of the dolly to roll over unequal surfaces where one wheel might be raised or dropped below the others.

The load of the vehicle, illustrated in dotted lines at 17, causes deflection of the tube 14, but by offsetting the tube 13, deflection of the tube 14 is permitted without casing the truck 10 to be inclined from the vertical.

The unique structure supplies torsion tubes to apply desirable springing characteristics and then is provided with means for cancelling out other undesirable springing effects.

The outer end of the tube 13 is preferably partially closed by means of a strap 21 so that in positioning the tube within the truck, the torsion tube can be readily and quickly positioned in the tube 13 even under night-time conditions.

After the torsion tube has been properly placed, a locking pin 22 is inserted through the upper face of the channel 12 and through matched openings 23, 24, 25 and 26 in the tubes 13 and 14 and through a suitable opening in the lower flange of channel 12. The locking means has a swing plate at 27 so that it may be readily rotated, and a nut 28 is provided on the lower face of the channel 12 and welded thereto so that the locking means will not work loose in use. A pair of outwardly projecting stub axles 31 are provided on each truck and the stub portions pass through the walls of the channel 12 and plate 16 in the same manner as the tubes 13, and the stub axles are welded in place in the channel and plate. The stub axles, however, project at 90 degrees with the face of the channel so that in running position, the wheels are in true vertical relation, even though the torque tubes 14 are distorted and bend downwardly by the load of the vehicle, as illustrated at 17.

In order to properly support the vehicle and adapt the device for carrying vehicles of different tread, we provide curved plates, illustrated at 41, and these curved plates have a stiffening member 42 at the inner end thereof which not only serves to stiffen the curved plate 41, but also serves as part of the support for a narrow tread vehicle, such as the "Volkswagon."

The torque tubes are sufficiently spaced apart so that the wheels of a vehicle, as illustrated in Figure 1, drop down to the position between the torque tubes such that the angle of application of the supporting force for the vehicle wheel, is at a sufficient angular degree with reference to the horizontal, so that the wheels will not become dislodged from the cradle of the dolly. It would be possible, of course, to apply a force above the point of application of the forces of the torque tubes sufficient to dislodge the vehicle from the dolly, but as a practical consideration, the angle of application of the forces of the torque tubes against the wheels is so great that it would be difficult to apply a force of sufficient magnitude above these points to dislodge the wheel.

It might be possible for the horizontal component of force, acting below the point of application of the torque tube forces, to rotate one end of the dolly out from under the vehicle, but the torque tube passing to the other side of the vehicle to the other dolly would then come into play and would resist this rotation. This is one of the reasons that the torque tubes and their mounting is of importance to our invention, since it is one of the main objects of the invention to provide a dolly mounting such that the dolly does not need to be chained to the vehicle. In practice we have found that the built-in torsion effect of the torque tubes and the peculiar structure of the dolly and trucks permits it to be used under severe conditions of high speed and rough and muddy terrain.

Although the dolly is readily assembled and disassembled, and lightly constructed, it is even possible for the truck driver to badly misuse the dolly by driving his truck over shoulder gutters and onto the shoulders of roads, through ditches, and at speeds of 65 to 70 miles per hour without dislodging the dolly.

One truck of the dolly, complete with wheels as illustrated in Figure 3, will weigh in the neighborhood of 75 pounds, and the handle 51 is so located above the center of gravity of the truck that it may be readily carried by one hand in the horizontal or operative position here shown. This dolly is readily dismounted by removing the four pins, such as shown at 22, and may be placed in the tray of a truck is illustrated in Figure 4.

In Figure 5 we have attempted to illustrate how a pair of torque tubes or torsion tubes 14 will be twisted, as a wheel such as the wheel 71, is raised above the other wheels of the dolly as in going over a gutter, ditch or the like. It may be ascertained that if wheel 71 is raised, the pinned connections of the torque tubes 14 at the opposite ends of the torque tubes will cause them to be twisted by the forces acting in the direction of the arrows, and of course the tubes will resist in ever increasing degree the rotational effect of unequal height of the wheels to afford a springing action which will tend to bring the dolly back to its normal position.

The dolly acts in conjunction with the wheels of the vehicle as well, since these wheels can rotate independently from each other. The vehicle springs and wheels and the springing of the torsion bars or torque tubes and the cushioning effect of the tires of the dolly all make it unnecessary to provide any additional springing or provide any other means to permit contour following motion or for movement of the dolly over rough terrain.

In operation, even though the dolly is positioned in place only by the weight of the vehicle, one truck may rotate to a surprising degree, as when one side rolls over a curb or gutter, without displacing the dolly. The wheel of the vehicle going over the curb may be seen to rotate to a considerable degree with reference to the other, but both trucks cling tight without becoming dislodged. The effect is startling and almost like that of viewing a caterpillar tread vehicle going over the obstacle.

Although we have described a specific embodiment of our invention, it is apparent that modifications thereof may be made by those skilled in the art. Such modifications may be made without departing from the spirit and scope of our invention as set forth in the appended claims.

We claim as our invention:

1. A dolly for transporting a vehicle comprising a spaced, opposed pair of horizontally extending frame members, a pair of wheels mounted on each of said frame members for rotation on fixed horizontal axes extending laterally from said frame members, one wheel of each of said pair of wheels being disposed rearwardly of the other wheel in said pair, each wheel of a pair being opposed to a wheel in the spaced pair of wheels to provide a set of opposed wheels, a pair of pan members positioned inboard of a set of opposed wheels, a torsion member extending between said frame members and having end portions, and means for rigidly securing each of said end portions to the frame member adjacent thereto, said torsion member being spaced from the horizontal axes of rotation of one set of opposed wheels of said pairs of wheels, each of said pan members being connected to said torsion member adjacent a terminal end thereof and extending toward the horizontal axes of rotation of the other set of opposed wheels, whereby said pan members and said set of opposed wheels remote from said torsion member are rotatable with respect to the longitudinal axis of said torsion member.

2. A dolly for transporting a vehicle as set forth in claim 1 wherein said horizontally extending frame members comprise a spaced pair of box-like frame members, each having an inboard sidewall, said inboard sidewalls of said frame members being opposed to one another, said means for rigidly securing each of the end portions of said torsion member to said frame comprising a spaced pair of short, hollow tube-like members, each of said tube-like members being rigidly connected to a corresponding one of said frame members and extending laterally from the inboard sidewall of said frame member, each free end portion of said torsion member being telescopically engaged with a corresponding one of said tube-like members, and stub axles adapted to receive said wheels secured to said box-like frame members and extending laterally therefrom.

3. A dolly as set forth in claim 2 wherein said means for rigidly securing each of the end portions of said torsion member to said frame further comprises a pin member detachably engaging a free end portion of said torsion member and the adjacent frame member.

4. A dolly as set forth in claim 2 wherein each inboard sidewall of said spaced box-like frame members is provided with an opening and the corresponding short hollow tube-like member rigidly secured thereto extends laterally from the opening in said inboard sidewall.

5. A dolly as set forth in claim 4, wherein the corresponding short hollow tube-like member rigidly secured to a frame-member extends through said opening in said sidewall into said frame member.

6. A dolly for engaging the spaced opposed wheels of a single pair of wheels of a vehicle and for transporting said vehicle comprising a spaced, opposed pair of horizontally extending frame members, a pair of wheels mounted on each of said frame members for rotation on fixed horizontal axes extending laterally and perpendicularly from said frame members, one wheel of each of said pair of wheels being spaced from and disposed rearwardly of the other wheel in said pair, each wheel of said pair of wheels being positioned adjacent an end of the frame member upon which it is mounted, each wheel of said spaced pair of wheels being opposed to a wheel in the pair of wheels mounted on the spaced frame member to provide a set of opposed wheels, a pair of pan members positioned inboard of a set of opposed wheels, each of said pan members having terminal end portions and a recessed intermediate portion to permit each pan member to receive a single wheel of the vehicle to be transported, a torsion member extending between said spaced frame members and having end portions, and means for rigidly securing each of said torsion member end portions to the frame member adjacent thereto, said torsion member being positioned between the adjacent horizontal axes of rotation of the sets of opposed wheels closely adjacent the horizontal axes of rotation of one set of opposed wheels and spaced from the horizontal axes of rotation of the other set of opposed wheels, each of said pan members being connected to said torsion member adjacent a terminal end thereof and extending toward the horizontal axes of rotation of the other set of opposed wheels to provide a support for one wheel of a single spaced pair of wheels of said vehicle to be transported, whereby the wheels of only a single spaced opposed pair thereof of the vehicle to be transported are freely engaged and supported by a corresponding pan member and said pan members and said set of opposed wheels remote from said torsion member are rotatable about the longitudinal axis of said torsion member.

7. A dolly for engaging the spaced opposed wheels of a single pair of wheels of a vehicle and for transporting said vehicle comprising a spaced, opposed pair of horizontally extending frame members, a pair of wheels mounted on each of said frame members for rotation on fixed horizontal axes extending laterally from said frame members, one wheel of each of said pair of wheels being spaced from and disposed rearwardly of the other wheel of said pair, each wheel of said pair of wheels being opposed to a wheel in the pair of wheels mounted on the spaced frame member to provide a set of opposed wheels, a pair of pan members positioned inboard of a set of opposed wheels, spaced torsion members extending between said spaced frame members, each of said torsion members having end portions, and means for rigidly securing each of said end portions to the frame member adjacent thereto, each of said torsion members being spaced from the horizontal axes of rotation of one of said sets of opposed wheels, each of said pan members being positioned adjacent one of said frame members and extending between and connected to each of said spaced torsion members adjacent the terminal ends thereof secured to said frame member adjacent to said pan member.

References Cited in the file of this patent

UNITED STATES PATENTS

| | | |
|---|---|---|
| 426,474 | Smalley et al. | Apr. 29, 1890 |
| 1,067,934 | Martin | July 22, 1913 |
| 1,871,180 | Kegresse | Aug. 9, 1932 |
| 2,174,661 | Hope et al. | Oct. 3, 1939 |
| 2,215,425 | Longfellow | Sept. 17, 1940 |
| 2,599,366 | Bohnenblust | June 3, 1952 |
| 2,639,926 | Parks | May 26, 1953 |
| 2,661,856 | Stanley et al. | Dec. 8, 1953 |

FOREIGN PATENTS

| | | |
|---|---|---|
| 732,291 | France | June 14, 1932 |